(12) United States Patent
Yabe et al.

(10) Patent No.: US 9,683,471 B2
(45) Date of Patent: Jun. 20, 2017

(54) EXHAUST EMISSION CONTROL DEVICE

(75) Inventors: Masahiko Yabe, Hino (JP); Haruyuki Yokota, Hino (JP); Takaharu Shimizu, Hino (JP); Hiroyuki Ninomiya, Hino (JP); Shinya Sato, Hino (JP); Takahiko Hayashi, Hino (JP); Shunsuke Toshioka, Toyota (JP); Satoshi Watanabe, Toyota (JP); Tomihisa Oda, Toyota (JP); Yutaka Tanai, Toyota (JP)

(73) Assignees: HINO MOTORS, LTD., Tokyo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 462 days.

(21) Appl. No.: 12/667,767

(22) PCT Filed: Jul. 4, 2008

(86) PCT No.: PCT/JP2008/001795
§ 371 (c)(1),
(2), (4) Date: Jan. 5, 2010

(87) PCT Pub. No.: WO2009/008148
PCT Pub. Date: Jan. 15, 2009

(65) Prior Publication Data
US 2010/0192547 A1 Aug. 5, 2010

(30) Foreign Application Priority Data
Jul. 6, 2007 (JP) .................. 2007-178712

(51) Int. Cl.
*F01N 3/00* (2006.01)
*F01N 3/20* (2006.01)
(Continued)

(52) U.S. Cl.
CPC ....... *F01N 3/2066* (2013.01); *B01D 53/9431* (2013.01); *F01N 3/0814* (2013.01);
(Continued)

(58) Field of Classification Search
CPC ... F01N 2610/02; F01N 13/009; F01N 3/0814
(Continued)

(56) References Cited

U.S. PATENT DOCUMENTS 6,182,443 B1 * 2/2001 Jarvis et al. ............... 60/274
7,628,009 B2 * 12/2009 Hu et al. ................... 60/274
(Continued)

FOREIGN PATENT DOCUMENTS

JP 2000 230414 8/2000
JP 2002 161732 6/2002
(Continued)

OTHER PUBLICATIONS

Machine English translation of JP 2007-040221.*
U.S. Appl. No. 12/679,677, filed Mar. 24, 2010, Kowada.

*Primary Examiner* — Mark Laurenzi
*Assistant Examiner* — Jason Sheppard
(74) *Attorney, Agent, or Firm* — Oblon, McClelland, Maier & Neustadt, L.L.P.

(57) ABSTRACT

An exhaust emission control device including a selective reduction catalyst; urea water as reducing agent being added in the pipe upstream of the reduction catalyst depurate $NO_x$ through reduction; an oxidation catalyst arranged in the pipe upstream of an added position of the urea water, the oxidation catalyst physically adsorbing $NO_x$ in the exhaust gas at a temperature lower than a lower active limit temperature of the reduction catalyst and discharging the adsorbed $NO_x$ at a temperature higher than a lower active limit temperature of the oxidation catalyst; and a fuel injection device for adding fuel into the exhaust gas upstream of the oxidation catalyst is disclosed. The start of the fuel addition by the fuel injection device is refrained until exhaust temperature on an inlet side of the reduction catalyst is increased to a preset
(Continued)

temperature comparable with the lower active limit temperature of the oxidation catalyst.

5 Claims, 2 Drawing Sheets

(51) Int. Cl.
 F01N 3/08 (2006.01)
 F01N 3/10 (2006.01)
 F01N 9/00 (2006.01)
 F01N 13/00 (2010.01)
 B01D 53/94 (2006.01)

(52) U.S. Cl.
 CPC ............... F01N 3/103 (2013.01); F01N 9/00 (2013.01); F01N 13/009 (2014.06); B01D 53/944 (2013.01); B01D 53/9418 (2013.01); B01D 2251/208 (2013.01); B01D 2251/2067 (2013.01); B01D 2258/012 (2013.01); F01N 2570/14 (2013.01); F01N 2610/02 (2013.01); F01N 2610/03 (2013.01); F01N 2900/1404 (2013.01); F01N 2900/1602 (2013.01); Y02T 10/24 (2013.01); Y02T 10/47 (2013.01)

(58) Field of Classification Search
 USPC .......................... 60/287, 295, 297, 301, 286
 See application file for complete search history.

(56) References Cited

U.S. PATENT DOCUMENTS

| | | | |
|---|---|---|---|
| 7,650,746 B2* | 1/2010 | Hu et al. ........................ | 60/286 |
| 2004/0118106 A1* | 6/2004 | Liang et al. .................... | 60/278 |
| 2005/0091968 A1* | 5/2005 | van Nieuwstadt et al. .... | 60/286 |
| 2007/0089403 A1* | 4/2007 | Pfeifer et al. .................. | 60/286 |
| 2007/0175205 A1* | 8/2007 | Robel et al. ................... | 60/286 |
| 2008/0066455 A1* | 3/2008 | Viola .............................. | 60/286 |

FOREIGN PATENT DOCUMENTS

| | | | |
|---|---|---|---|
| JP | 2005 256727 | | 9/2005 |
| JP | 2007040221 | * | 2/2007 |
| JP | 2007 154755 | | 6/2007 |

* cited by examiner

EXHAUST EMISSION CONTROL DEVICE

TECHNICAL FIELD

The present invention relates to an exhaust emission control device applied to an engine such as a diesel engine.

BACKGROUND ART

Conventionally, some diesel engines have a selective reduction catalyst incorporated in an exhaust pipe through which exhaust gas flows, said catalyst having a feature of selectively reacting $NO_x$ with a reducing agent even in the presence of oxygen. A required amount of reducing agent is added upstream of and is reacted on the reduction catalyst with $NO_x$ (nitrogen oxides) in the exhaust gas to thereby reduce a concentration of the discharged $NO_x$.

Effectiveness of ammonia ($NH_3$) used as a reducing agent for depuration through reduction of $NO_x$ is well known in a field of industrial flue gas denitration in, for example, a plant. However, in a field of automobile where safety is hard to assure as to running with toxic ammonia being loaded, researches have been made aware nowadays on use of nontoxic urea water as a reducing agent (see, for example, Patent Literature 1).

Specifically, urea water added to exhaust gas upstream of a selective reduction catalyst is pyrolytically decomposed into ammonia and carbon dioxide gas in the exhaust gas so that $NO_x$ in the exhaust gas is favorably depurated through reduction on the reduction catalyst by ammonia.

Use of such urea water as the reducing agent requires exhaust temperature of about 200° C. or more so as to exert sufficient catalytic activity in the reductive reaction. Thus, there is a problem that, if an operating status with exhaust temperature of lower than 200° C. continues (generally speaking, low-load operational areas are areas with low exhaust temperature), $NO_x$ reduction ratio is hard to enhance. For example, in a vehicle such as a city shuttle-bus with travel pattern of almost always traveling on congested roads, an operation at a required exhaust temperature or more may not continue for a long time and operational transitions may occur with no chance of $NO_x$ reduction ratio being enhanced, failing in obtaining satisfactory $NO_x$ reduction effect.

In order to overcome this, the inventors came to devise incorporation of an oxidation catalyst in the exhaust pipe upstream of the added position of the urea water; when the exhaust gas does not yet reach a lower active limit temperature of the selective reduction catalyst, fuel is added in the exhaust pipe upstream of the urea water added position to bring about oxidation reaction of the added fuel through the oxidation catalyst, the exhaust gas being elevated in temperature by the resultant reaction heat to a required temperature for temperature elevation of a catalyst floor of the selective reduction catalyst. The inventors are further considering that the oxidation catalyst is made to have a property of physically adsorbing $NO_x$ in the exhaust gas to attain $NO_x$ reduction through adsorption of $NO_x$ by the oxidation catalyst in operational areas where the temperature of the exhaust gas is lower than the lower active limit temperature of the selective reduction catalyst.

[Patent Literature 1] JP 2002-161732A

SUMMARY OF INVENTION

Technical Problems

However, verifications using the oxidation catalyst mainly constituted by, for example, zeolite and having $NO_x$ adsorption capability as mentioned in the above were conducted to reveal that this kind of oxidation catalyst physically adsorbs $NO_x$ in exhaust gas when the oxidation catalyst has a catalytic floor temperature lower than the lower active limit temperature of the selective reduction catalyst of about 200° C., and discharges the adsorbed $NO_x$ at and around about 200° C. and that, for example, at startup (cold start) after a long-time engine rest, the catalytic floor temperature of the upstream oxidation catalyst is rapidly increased to about 200° C. by the fuel addition whereas the catalytic floor temperature of the downstream selective reduction catalyst is slowly increased to about 200° C. with a necessary time delay, so that such time delay in increase of the catalytic floor temperature may bring about a time band at which $NO_x$ cannot be depurated through reduction by the selective reduction catalyst even if discharge of the adsorbed $NO_x$ from the oxidation catalyst is started, disadvantageously resulting in increase of $NO_x$ discharge amount in such time band.

The invention was made in view of the above and has its object to exert favorable $NO_x$ reducing effects even at an exhaust temperature lower than in the prior art without trouble, for example, at startup after a long-time engine rest.

Solution to Problems

The invention is directed to an exhaust emission control device wherein a selective reduction catalyst capable of selectively reacting $NO_x$ with ammonia even in the presence of oxygen is incorporated in an exhaust pipe, urea water as a reducing agent being added in the exhaust pipe upstream of said selective reduction catalyst so as to depurate $NO_x$ through reduction, characterized in that it comprises an oxidation catalyst arranged in the exhaust pipe upstream of an added position of the urea water, said oxidation catalyst having a feature of physically adsorbing $NO_x$ in the exhaust gas at a temperature lower than a lower active limit temperature of the selective reduction catalyst and discharging the adsorbed $NO_x$ at a temperature higher than a lower active limit temperature of the oxidation catalyst, and fuel addition means for adding fuel into the exhaust gas upstream of said oxidation catalyst, start of the fuel addition by said fuel addition means being refrained until an exhaust temperature on an inlet side of said selective reduction catalyst is increased to a preset temperature comparable with the lower active limit temperature of said oxidation catalyst.

Thus, even when the catalytic floor temperature of the selective reduction catalyst does not yet reach its lower active limit temperature, i.e., even in a lower exhaust temperature condition where $NO_x$ cannot be depurated through reduction by the reduction catalyst, the $NO_x$ discharge amount is suppressed by physically adsorbing $NO_x$ in the exhaust gas by the oxidation catalyst. Even in a temperature region where no physical adsorption of $NO_x$ to the oxidation catalyst nor depuration through reduction of $NO_x$ by the selective reduction catalyst are allowed, addition of the fuel by the fuel addition means is started provided that the exhaust temperature on an inlet side of the selective reduction catalyst has reached a preset temperature comparable with the lower active limit temperature of the oxidation catalyst, so that resulting reaction heat due to the oxidation reaction of the added fuel on the oxidation catalyst elevates in temperature the exhaust gas, introduction of such heated exhaust gas bringing about rapid increase in temperature of the catalytic floor of the selective reduction catalyst to the lower active limit temperature of the selective reduction catalyst, thereby fulfilling the conditions for depuration of $NO_x$, through reduction by addition of the urea water.

Then, after the temperature of the exhaust gas is increased due to the addition of the fuel to the oxidation catalyst, the urea water is added upstream of the selective reduction catalyst so that the urea water is pyrolytically decomposed in the exhaust gas into ammonia and carbon dioxide gas, $NO_x$, in the exhaust gas being effectively reacted with the ammonia on the selective reduction catalyst which is being active in the temperature condition above its lower active limit temperature, thereby attaining favorable depuration through reduction.

However, for example, at startup (cold start) after a long-time engine rest, even if the catalytic floor temperature of the oxidation catalyst has reached its lower active limit temperature, start of the fuel addition by the fuel addition means is refrained until the exhaust temperature on the inlet side of the selective reduction catalyst is increased to the preset temperature comparable with the lower active limit temperature of the oxidation catalyst. As a result, in comparison with a conventional case where the fuel addition is started instantly after the catalytic floor temperature of the oxidation catalyst reaches its lower active limit temperature, increase in catalytic floor temperature of the oxidation catalyst is slow to retard the increase of the catalytic floor temperature of the oxidation catalyst to the $NO_x$, discharge temperature.

Thus, with a little lapse of time after the catalytic floor temperature of the oxidation catalyst reaches the $NO_x$, discharge temperature and discharge of the adsorbed $NO_x$ is started, the exhaust temperature on the inlet side of the selective reduction catalyst reaches the preset temperature and the fuel addition by the fuel addition means is started, so that the resultant reaction heat due to the oxidation reaction of the added fuel on the oxidation catalyst elevates in temperature the exhaust gas and the catalytic floor temperature of the selective reduction catalyst rapidly reaches its lower active limit temperature, thereby fulfilling the conditions for depuration of $NO_x$, through reduction by the addition of the urea water. As a result, for example at startup (cold start) after a long-time engine rest, a time band at which $NO_x$, discharged from the oxidation catalyst cannot be depurated through reduction by the selective reduction catalyst is substantially shortened, increase of the $NO_x$ discharge amount being prevented as much as possible.

When the invention is carried out more specifically, preferably a fuel injection device for injection of fuel to respective cylinders in the engine is employed as fuel addition means, the fuel addition being conducted by controlling the fuel injection into the cylinders so as to leave much unburned fuel in the exhaust gas, which makes it possible to conduct the fuel addition through effective utilization of the existing fuel injection device, which removes the necessity of providing any new supplementary items for the fuel addition.

Advantageous Effects of Invention

The above-mentioned exhaust emission control device of the invention can attain the following effects and advantages. That is, even if the catalytic floor temperature of the selective reduction catalyst does not yet reach the lower active limit temperature, the $NO_x$ discharge amount can be suppressed by physical adsorption of $NO_x$, in the exhaust gas to the oxidation catalyst. Moreover, when the exhaust temperature on the inlet side of the selective reduction catalyst reaches the preset temperature comparable with the lower active limit temperature of the oxidation catalyst, the fuel addition by the fuel addition means is started to bring about the oxidation reaction of the added fuel on the oxidation catalyst and the resultant reaction heat can elevate the temperature of the exhaust gas to rapidly increase the catalytic floor temperature of the selective reduction catalyst to its lower active limit temperature, so that favorable $NO_x$, reduction effects can be obtained in an exhaust temperature lower than in the prior art even in a case of a vehicle with travel pattern such that an operational condition with lower exhaust temperature continues for a long time. Moreover, for example at startup (cold start) after a long-time engine rest, a time band at which $NO_x$, discharged from the oxidation catalyst cannot be depurated through reduction by the selective reduction catalyst can be substantially shortened, so that the situation of the $NO_x$, discharge amount being increased at the time band can be prevented as much as possible.

Figure 1:
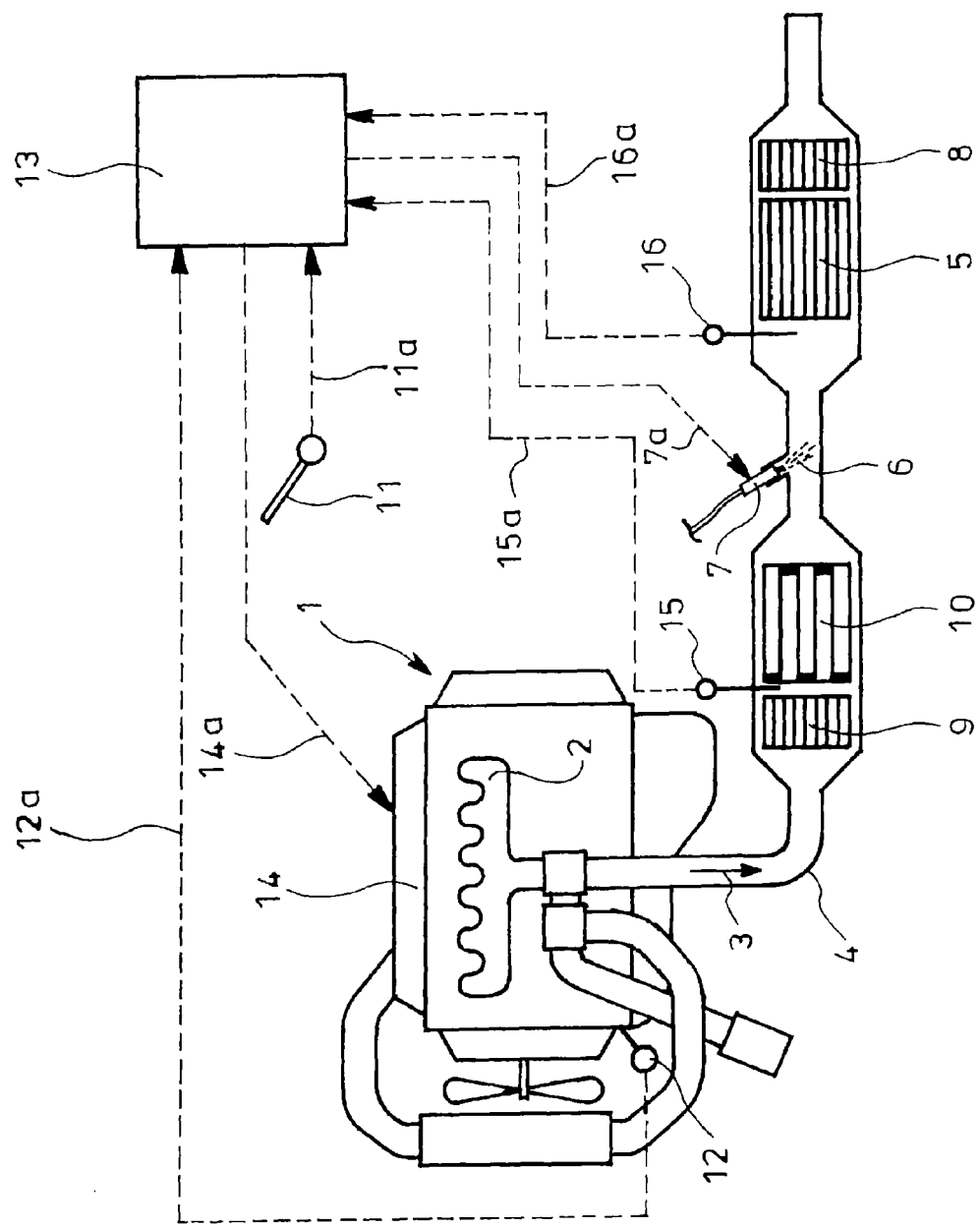
FIG. 1 is a schematic view showing an embodiment of the invention.

REFERENCE SIGNS LIST 1 diesel engine (engine)
3 exhaust gas
4 exhaust pipe
5 selective reduction catalyst
6 urea water
7 urea water adding injector
9 oxidation catalyst
14 fuel injection device (fuel addition means)
15 temperature sensor
16 temperature sensor

DESCRIPTION OF EMBODIMENTS

An embodiment of the invention will be described in conjunction with drawings.

FIG. 1 shows the embodiment of the invention. In the embodiment of an exhaust emission control device, a selective reduction catalyst 5 with a feature capable of selectively reacting $NO_x$, with ammonia even in the presence of oxygen is incorporated in an exhaust pipe 4 through which flows exhaust gas 3 discharged from a diesel engine 1 via an exhaust manifold 2.

A urea water adding injector 7 (urea water adding means) is arranged to inject urea water 6 as reducing agent into the exhaust pipe 4 upstream of the selective reduction catalyst 5. Arranged just behind the selective reduction catalyst 5 is an $NH_3$, slip catalyst 8 which brings about oxidation treatment of surplus ammonia for prevention of ammonia from leaking.

Arranged in the exhaust pipe 4 upstream of the added position of the urea water 6 by the injector 7 is an oxidation catalyst 9 with enhanced function of oxidizing unburned fuel in the exhaust gas 3. The oxidation catalyst 9 employed is mainly constituted by zeolite which is excellent in physically adsorbing $NO_x$, in the exhaust gas; the oxidation catalyst has the ability of physically adsorbing $NO_x$, in the exhaust gas 3 at a temperature of about 150° C. or less which is lower than about 200° C., i.e., the lower active limit temperature of the selective reduction catalyst 5 as well as discharging the adsorbed $NO_x$, at and around about 200° C. which is higher than the lower active limit temperature of the oxidation catalyst.

It is to be noted that $NO_x$, adsorption mentioned in the above is entirely different from $NO_x$, storage by means of $NO_x$, storage-reduction catalyst already developed into practical application (having a feature of oxidizing $NO_x$ in the exhaust gas 3 to temporarily store the same in the form of nitrate salt when air-fuel ratio in the exhaust is lean and a feature of decomposing and discharging $NO_x$ through the intervention of, for example, unburned hydrocarbon and CO to depurate $NO_x$, through reduction when the concentration of $O_2$, in the exhaust gas 3 is lowered).

Zeolite is porous crystalline aluminosilicate material which has not only a feature of having uniform, regularly oriented and molecular-level pores through which various molecules are adsorbed into cavities or pore passages but also a feature of serving as molecular sieve due to the uniform pores (i.e., adsorbing only molecules with diameter smaller than that of the pores), a feature of strongly adsorbing polar materials due to actions of cation and anion in the crystal structure as well as a feature of having catalyst effect.

Though such zeolite may be classified into various kinds depending upon types of backbone structures, selection may be appropriately made on the condition that it is highly heat-resistive and durable and is excellent in an ability of adsorbing $NO_x$, and hydrocarbon into the pores under the condition of the exhaust being low-temperatured and in an ability of slowly reacting the adsorbed hydrocarbon with oxygen in the exhaust gas into hydrocarbon monoxide under the condition of the exhaust being low-temperatured; alternatively, selection may be made among zeolite-analogous compounds with the similar features.

Arranged just behind the oxidation catalyst 9 is a particulate filter 10 which itself integrally carries oxidation catalyst. The oxidation catalyst 9 is also used for forced regeneration of the particulate filter 10, which fact is specifically referred to hereinafter.

An accelerator associated with a driver seat (not shown) is provided with an accelerator sensor 11 (load sensor) which detects an accelerator stepped-in degree as load of the diesel engine 1. The diesel engine 1 is provided at its appropriate position with a speed sensor 12 for detection of a revolution speed of the engine. An accelerator stepped-in degree signal 11a, and a revolution speed signal 12a, from the accelerator sensor 11 and the speed sensor 12, respectively, are inputted into a controller 13 serving as an engine controlling computer (ECU: Electronic Control Unit).

Outputted from the controller 13 and depending upon a current operating condition conceived from the accelerator stepped-in degree signal 11a, and the revolution speed signal 12a, is a fuel injection signal 14a, for commanding a fuel injection timing and injection amount to the fuel injection device 14 for injection of fuel into the respective cylinders.

The fuel injection device 14 comprises a plurality of injectors (not shown) each for each of the cylinders. An electromagnetic valve of each injector is properly controlled for valve-opening by the fuel injection signal 14a, from the controller 13, so that fuel injection timing and injection amount (valve-opening time period) are properly controlled.

In the embodiment, the fuel injection signal 14a, in normal mode is decided by the controller 13 on the basis of the accelerator stepped-in degree signal 11a, and the revolution speed signal 12a. When the exhaust temperature on an outlet side of the oxidation catalyst 9 does not yet reach the lower active limit temperature (on the order of about 200° C.) of the selective reduction catalyst 5, which fact is known on the basis of a detection signal 15a, from a temperature sensor 15, increase of the exhaust temperature on the inlet side of the selective reduction catalyst 5 to a preset temperature comparable with the lower active limit temperature (on the order of about 150° C.) of the oxidation catalyst 9 is awaited on the basis of a detection signal 16a from a temperature sensor 16; when the awaited increase in temperature is attained, the normal mode is changed over into a temperature rising mode where the fuel injection signal 14a, is decided such that the main injection of the fuel in the vicinity of the compression upper dead center (with crank angle of 0°) is followed by post injection at non-ignition timing after the compression upper dead center (a start period is at a crank angle of 90°-130°).

Specifically, the fuel injection device 14 according to the embodiment serves as fuel addition means which adds fuel into the exhaust gas 3 upstream of the oxidation catalyst 9. When the main injection is followed by the post injection at the non-ignition timing after the compression upper dead center as mentioned in the above, the unburned fuel (mainly constituted by HC: hydrocarbon) is added into the exhaust gas 3 by the post injection, so that the oxidation reaction is brought about as the unburned fuel passes through the oxidation catalyst 9; the resultant reaction heat elevates in temperature the exhaust gas 3 to increase the catalytic floor temperature of the selective reduction catalyst 5 arranged behind.

Also extracted in the controller 13 are the revolution speed of the diesel engine 1 and the fuel injection amount derived from the output value of the fuel injection signal 14a. A basic $NO_x$, generation amount in the current operating condition of the diesel engine 1 is estimated using a map of $NO_x$, generation amount depending upon the revolution speed and the injection amount; addition of urea water 6 in a required amount matching with such $NO_x$, generation amount is commanded as urea water injection signal 7a, to the urea water adding injector 7, the amount of the urea water 6 to be added being properly modified depending upon an exhaust temperature just before the selective reduction catalyst 5 which is known from a detection signal 16a, from a temperature sensor 16.

In the embodiment shown, the particulate filter 10 is arranged behind the oxidation catalyst 9. Thus, also when forced regeneration of the particulate filter 10 becomes required, the normal mode is changed over into the temperature rising mode where the fuel addition is conducted by the post injection similar to that mentioned in the above and the unburned fuel (mainly constituted by HC: hydrocarbon) added into the exhaust gas 3 undergoes oxidation reaction during its passage through the frontward oxidation catalyst 9, the exhaust gas 3 elevated in temperature by the resultant reaction heat flowing into the backward particulate filter 10 to elevate the catalytic floor temperature of the particulate filter, whereby the particulates are forcibly burned out.

It is, of course, to be noted that, though the technique itself of bringing about fuel addition by the post injection is the same, the forced regeneration of the particulate filter 10 is inherently different from the increasing of the catalytic floor temperature of the selective reduction catalyst 5 with respect to control logic of the post injection.

Specifically, extracted in the controller 13 are the revolution speed of the diesel engine 1 and the fuel injection amount derived from the output value of the fuel injection signal 14a;, a basic particulate generation amount in the current operating condition of the diesel engine 1 is estimated depending upon the extracted data on the engine speed and the fuel injection amount, using a map of particulate generation amount. The estimated basic particulate generation amount is multiplied by a correction factor applied in consideration of various parameters on generation of the particulates and then an amount of the particulates burned off in the current engine operation state is subtracted therefrom to obtain a final particulate generation amount. Such final particulate generation amount is momentarily submitted to a cumulative computation to estimate an accumulated amount of the particulates. When the accumulated amount of the particulates thus estimated reaches a predetermined target value, it is judged that forced regeneration of the particulate filter 10 is required.

There have been various proposals for estimating such accumulated amount of the particulates; other methods than is illustrated above may be, of course, employed for estimation of the accumulated amount of the particulates. For example, the accumulated amount of the particulates may be estimated on the basis of differences in pressure before and after the particulate filter or estimated in terms of operation time or travel distance.

Thus, even if the catalytic floor temperature of the selective reduction catalyst 5 does not reach the lower active limit temperature (in the order of about 200° C.) of the selective reduction catalyst, i.e., in the condition of lower exhaust temperature unsuitable for depuration through reduction by the selective reduction catalyst 5, the $NO_x$ discharge amount is suppressed by physical adsorption of $NO_x$ in the exhaust gas 3 to the oxidation catalyst 9. Even in a temperature region where no physical adsorption of $NO_x$ to the oxidation catalyst 9 nor depuration through reduction of $NO_x$ by the selective reduction catalyst 5 are allowable, provided that the exhaust temperature on the inlet side of the selective reduction catalyst 5 has reached the preset temperature comparable with the lower active limit temperature of the oxidation catalyst 9 (in the order of about 150° C.), the fuel addition by the post injection of the fuel injection device 14 is started so that the generated reaction heat due to the oxidation reaction of the added fuel on the oxidation catalyst 9 elevates the temperature of the exhaust gas 3. Introduction of the exhaust gas 3 thus elevated in temperature rapidly increases the catalytic floor temperature of the selective reduction catalyst 5, thereby fulfilling the conditions for depuration of $NO_x$ through reduction by addition of the urea water.

Then, when it is confirmed in the controller 13 on the basis of the detection signal 16a, from the temperature sensor 16 that the temperature of the exhaust gas 3 reaches the lower active limit temperature (in the order of about 200° C.) or more of the selective reduction catalyst 5, the urea water injection signal 7a, is outputted from the controller 13 to the urea water adding injector 7 and the urea water 6 is injected to be pyrolytically decomposed into ammonia and carbon dioxide gas in the exhaust gas 3, $NO_x$ in the exhaust gas 3 being effectively reacted with the ammonia for favorable depuration through reduction on the selective reduction catalyst 5 which is being activated under the temperature condition of more than its lower active limit temperature.

Figure 2:
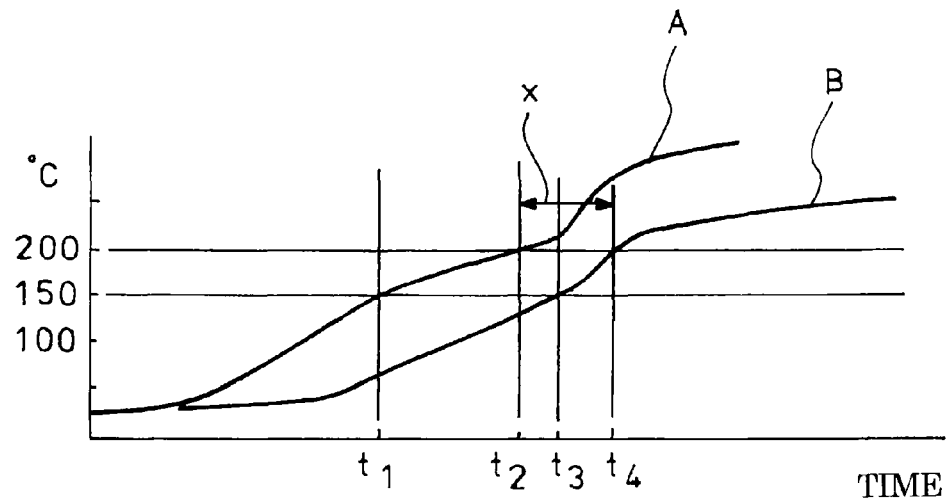
FIG. 2 shows, in graphs, transitions of the exhaust temperatures detected by the respective temperature sensors in the embodiment.

However, as shown in FIG. 2 in graphs, for example at startup (cold start) after a long-time engine rest, even if the exhaust temperature just after the oxidation catalyst 9 detected by the temperature sensor 15 (substitute for the catalytic floor temperature of the oxidation catalyst 9: curve A) has reached the lower active limit temperature (on the order of about 150° C.) of the oxidation catalyst already at step $t_1$, start of the fuel addition through the post injection by the fuel injection device 14 is refrained until the exhaust temperature on the inlet side of the selective reduction catalyst 5 detected by the temperature sensor 16 (substitute for the catalytic floor temperature of the selective reduction catalyst 5: curve B) reaches the preset temperature comparable with the lower active limit temperature (on the order of about 150° C.) of the oxidation catalyst 9. As a result, in comparison with a case where the fuel addition is started instantly after reaching of the catalytic floor temperature of the oxidation catalyst 9 to its lower active limit temperature (on the order of about 150° C.), increase in temperature of the catalytic floor temperature of the oxidation catalyst 9 becomes slower to retard the reaching to step $t_2$, where the catalytic floor temperature of the oxidation catalyst 9 reaches the $NO_x$ discharge temperature (on the order of about 200° C.).

As a result, even if the discharge of the adsorbed $NO_x$ is started at step $t_2$, where the catalytic floor temperature of the oxidation catalyst 9 reaches the $NO_x$ discharge temperature (on the order of about 200° C.), with a little lapse of time, step $t_3$, is started where the exhaust temperature on the inlet side of the selective reduction catalyst 5 reaches the preset temperature to start the fuel addition through the post injection by the fuel injection device 14, the generated reaction heat due to the oxidation reaction of the added fuel on the oxidation catalyst 9 bringing about elevation in temperature of the exhaust gas 3; as a result, the catalytic floor temperature of the selective reduction catalyst 5 is rapidly increased to reach its lower active limit temperature (on the order of about 200° C.) at step $t_4$, fulfilling the conditions for depuration through reduction of $NO_x$ by addition of the urea water 6. Thus, for example at startup (cold start) after the long-time engine rest, substantially shortened is a time band x where $NO_x$ discharged from the oxidation catalyst 9 cannot be depurated through reduction by the selective reduction catalyst 5. Increase of $NO_x$ discharge amount at the time band x is prevented as much as possible.

Figure 3:
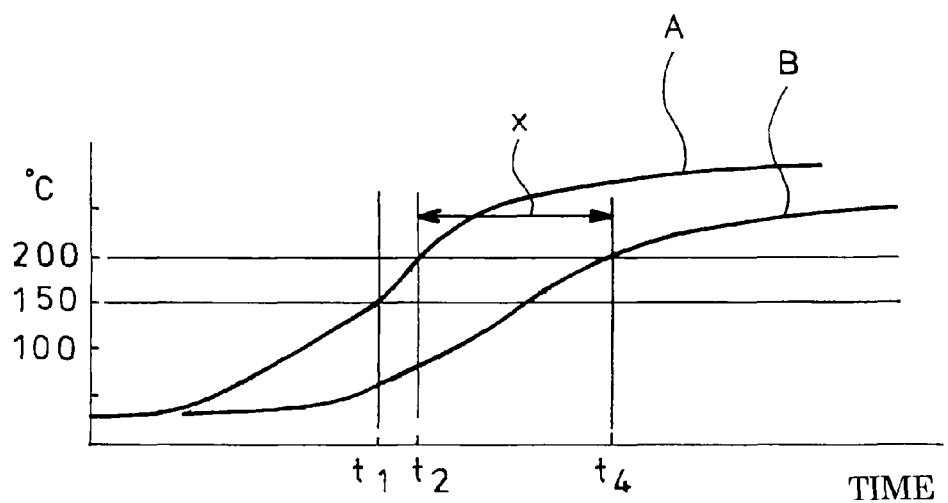
FIG. 3 shows, in graphs, a comparative example with fuel addition timing different from that in FIG. 2.

Shown in FIG. 3 in graphs is a comparative example where post injection is instantly started at step $t_1$, where the exhaust temperature just after oxidation catalyst 9 detected by the temperature sensor 15 (substitutive for the catalytic floor temperature of the oxidation catalyst 9: curve A) reaches about 150° which is the lower active limit temperature of the oxidation catalyst 9. In the graphs, the catalytic floor temperature of the oxidation catalyst 9 at step $t_1$, is rapidly increased by fuel addition into the order of about 200° C. at step $t_2$, so that discharge of $NO_x$ is early started while the catalytic floor temperature of the backward selective reduction catalyst 5 is slowly increased with a necessary time delay. As a result, it is time-consuming to reach step $t_4$, where conditions are fulfilled for depuration of $NO_x$ through reduction by addition of the urea water 6. Such time delay in increase of the catalytic floor temperature will prolong the time band x where $NO_x$ cannot be depurated through reduction by the selective reduction catalyst 5 though the discharge of the adsorbed $NO_x$ is started by the oxidation catalyst 9.

Thus, according to the above-mentioned embodiment, even if the catalytic floor temperature of the selective reduction catalyst 5 does not yet reach its lower active limit temperature, discharge of $NO_x$ can be suppressed by physical adsorption of $NO_x$ in the exhaust gas 3 to the oxidation catalyst 9. When the exhaust temperature on the inlet side of the selective reduction catalyst 5 reaches the preset temperature comparable with the lower active limit temperature of the oxidation catalyst 9, the fuel addition by the post injection of the fuel injection device 14 is started for oxidation reaction of the added fuel on the oxidation catalyst 9, the resultant reaction heat increasing the temperature of the exhaust gas 3 to rapidly increase the catalytic floor temperature of the selective reduction catalyst 5 to its lower active limit temperature, so that even in a case of a vehicle with a pattern with which an operation at a low exhaust temperature continues for a long time, favorable $NO_x$ reduction effects can be obtained even at an exhaust temperature lower than that at the prior art. Moreover, for example at startup (cold start) after a long-time engine rest, time band at which $NO_x$, discharged from the oxidation catalyst 9 cannot be depurated through reduction by the selective reduction catalyst 5 can be substantially shortened, so that the situation of the $NO_x$, discharge amount being increased at the time band can be prevented as much as possible.

It is to be understood that an exhaust emission control device of the invention is not limited to the above embodiment and that various changes and modifications may be made without departing from the scope of the invention. For example, in the above embodiment, the fuel injection device is applied as fuel addition means, and the fuel addition to the exhaust gas is conducted such that the main injection of fuel near the compression upper dead center is followed by post injection at non-ignition timing after the compression upper dead center. Alternatively, fuel addition to the exhaust gas may be conducted by delaying the main injection to the cylinders than usual. Furthermore, in addition to such measure of fuel addition through control of the fuel injection into the cylinders to leave much unburned fuel in the exhaust gas, an injector as fuel addition means may be attached at an appropriate position on and extend into the exhaust pipe (or the exhaust manifold as alternate), fuel being added to the exhaust gas through direct injection by the injector.

The invention claimed is:

1. An exhaust emission control device comprising:
a selective reduction catalyst capable of selectively reacting $NO_x$ with ammonia even in the presence of oxygen incorporated in an exhaust pipe;
a urea water adding injector which injects urea water as a reducing agent in the exhaust pipe upstream of said selective reduction catalyst so as to depurate $NO_x$ through reduction;
an oxidation catalyst arranged in the exhaust pipe upstream of the urea water adding injector, said oxidation catalyst having a feature of physically adsorbing $NO_x$ in exhaust gas at a temperature lower than a lower active limit temperature of the selective reduction catalyst and discharging the adsorbed $NO_x$ at a temperature higher than a lower active limit temperature of the oxidation catalyst; and
a fuel injector which adds fuel into the exhaust gas upstream of said oxidation catalyst;
a temperature sensor disposed at an inlet side of said selective reduction catalyst which measures a floor temperature of said selective reduction catalyst, said temperature sensor being disposed between said selective reduction catalyst and said urea water adding injector; and
an electronic control unit including a routine for exhaust emission control, the routine, when executed by the electronic control unit, performing the steps of:
measuring said floor temperature of said selective reduction catalyst using said temperature sensor and comparing said measured floor temperature of said selective reduction catalyst with a predetermined temperature which is comparable to the lower active limit temperature of said oxidation catalyst,
initiating an addition of fuel into the exhaust gas upstream of said oxidation catalyst using the fuel injector, when said measured floor temperature of said selective reduction catalyst is equal to said predetermined temperature comparable to the lower active limit temperature of said oxidation catalyst, and
initiating an injection of urea water into the exhaust gas using said urea water adding injector when said floor temperature of said selective reduction catalyst measured by said temperature sensor is equal to the lower active temperature of said selective reduction catalyst.

2. The exhaust emission control device as claimed in claim 1, wherein the fuel injector injects fuel into respective cylinders in the engine, and the step of adding fuel includes injecting fuel into the cylinders to leave unburned fuel in the exhaust gas.

3. The exhaust emission control device as claimed in claim 1. further comprising another temperature sensor disposed downstream of said oxidation catalyst and upstream of said urea water adding injector.

4. The exhaust emission control device as claimed in claim 1, further comprising a particulate filter disposed downstream of said oxidation catalyst.

5. The exhaust emission control device as claimed in claim 1, wherein the step of adding fuel occurs at a non-ignition timing after compression upper dead center.

* * * * *